United States Patent [19]

LiCausi

[11] Patent Number: 5,566,560
[45] Date of Patent: Oct. 22, 1996

[54] AIR BAG ANTI-THEFT DEVICE

[75] Inventor: Anthony LiCausi, 78-23 67th Rd., Maspeth, N.Y. 11379

[73] Assignee: Anthony LiCausi, Middle Village, N.Y.

[21] Appl. No.: 436,743

[22] Filed: May 8, 1995

[51] Int. Cl.⁶ ...................................................... E05B 73/00
[52] U.S. Cl. .................... 70/18; 70/209; 70/237; 70/417; 70/424
[58] Field of Search .................... 70/14, 18, 19, 70/211, 212, 209, 225, 226, 238, 258, 416, 417, 428, 423, 424, 425, 426, 427, 455, 237, 163, 164, 166, 158

[56] References Cited

U.S. PATENT DOCUMENTS

| | | | |
|---|---|---|---|
| 1,986,128 | 1/1935 | Trott | 70/212 |
| 3,401,543 | 9/1968 | Lewis | 70/211 |
| 3,457,745 | 7/1969 | Barber | 70/209 |
| 3,738,137 | 6/1973 | Jones | 70/428 |
| 3,982,602 | 9/1976 | Gorman | 70/212 |
| 4,008,589 | 2/1977 | Harrell | 70/18 |
| 4,008,590 | 2/1977 | Berkowitz et al. | 70/428 |
| 4,285,221 | 8/1981 | Atchisson | 70/416 |
| 4,304,111 | 12/1981 | Nolin | 70/18 |
| 4,426,859 | 1/1984 | Floyd | 70/18 |
| 4,598,562 | 7/1986 | Freeman | 70/417 |
| 4,722,205 | 2/1988 | Miranda | 70/211 |
| 4,955,215 | 9/1990 | Eremita | 70/18 |
| 5,275,030 | 1/1994 | Cole | 70/209 |
| 5,461,891 | 10/1995 | Noel | 70/209 |

FOREIGN PATENT DOCUMENTS 990530  6/1976  Canada ................................ 70/424

*Primary Examiner*—Darnell M. Boucher

[57] ABSTRACT

The present invention relates to an anti-theft device capable of engaging a middle portion of a steering wheel containing an air bag device. This device includes an air bag cover having a front portion, a first side portion and a second side portion. The first side portion and the second side portion both extend backward from the front portion. A stabilizing member for engaging a steering column and attached to the first side portion of the air bag cover. A bracket member attached to the air bag cover for securing the air bag cover to the steering wheel.

5 Claims, 3 Drawing Sheets

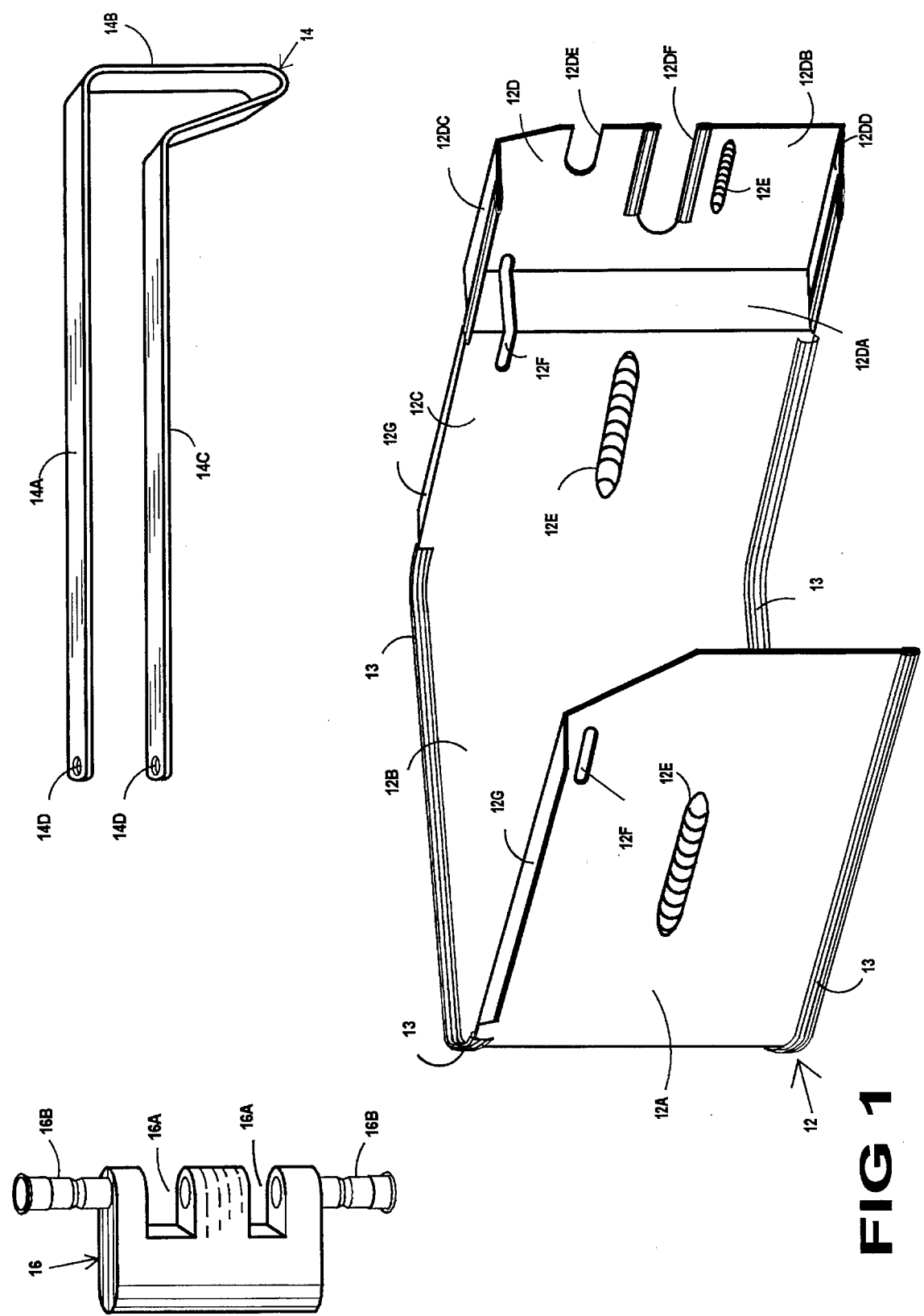

AIR BAG ANTI-THEFT DEVICE

RELATED APPLICATIONS

This application is related to U.S. patent application Ser. No. 08/436,741 titled, An Improved Anti-Theft Device by the same inventor Anthony LiCausi having a filing date of May 8, 1995.

BACKGROUND OF THE INVENTION

1. Field of the Invention

The present invention relates generally to an ant-theft device, more particularly, the present invention relates to a device that is capable of enclosing the center portion of a vehicle steering wheel to prevent the theft of an air bag device.

2. Description of Prior Art

The prior art discloses a number of anti-theft devices that are mounted to the steering wheel of a vehicle. A number of these devices engage the steering wheel in some fashion for preventing the rotation of the wheel. While other disclosed devices enclose the ignition switch of a vehicle for denying access to the ignition switch. Often these prior art devices do not work very well and are difficult to mount to the steering wheel. Also, these prior art devices do not prevent the theft of an air bag device contained within the center portion of the steering wheel. Therefore, there exists a need for an easy to use all purpose anti-theft device that can also prevent the theft of an air bag device.

Numerous innovations for anti-theft devices have been provided in the prior art that are described as follows. Even though these innovations may be suitable for the specific individual purposes to which they address, they differ from the present invention as hereinafter contrasted.

U.S. Pat. No. 5,113,674 to LiCausi, U.S. Pat. No. 5,212,970 to Harrell, U.S. Pat. No. 5,343,721 to Calnen, U.S. Pat. No. 5,353,614 to Anderson each disclose an anti-theft device. LiCausi discloses a yoke and bent bracket combination that is mounted to the steering column for preventing the rotation of the steering wheel and enclosing the ignition switch. Harrel discloses an enclosure that is mounted to the steering wheel for enclosing the ignition switch on the steering column or the dashboard. Calnen discloses a housing for enclosing an ignition switch that is held in place by cables fitting around the steering column. Anderson discloses a flat circular cover that is held in place over the front portion of the steering wheel by a plate section and bar assembly, wherein the device prevents the rotation of the wheel.

These patents differ from the present invention because a device is not disclosed that includes an air bag cover that is adapted to engage the middle portion of the steering wheel containing the air bag device and a bracket member for removably and/or hindgedly and/or fixedly securing the air bag cover thereon.

Numerous innovations for anti-theft devices have been provided in the prior art that are adapted to be used. Even though these innovations may be suitable for the specific individual purposes to which they address, they would not be suitable for the purposes of the present invention as heretofore described.

SUMMARY OF THE INVENTION

In according with the present invention, the air bag anti-theft device includes an air bag cover consisting of a front portion and two side portions adapted to engage and enclose the center portion of a steering wheel, wherein the first side portion has a stabilizing member that engages a side of the steering column and the second side portion also encloses the ignition switch. A bracket member having two legs that is removably and/or hindgedly and/or fixedly attached to the air bag cover.

Broadly considered, the invention comprises an anti-theft device that can be easily be secured to the steering wheel of a vehicle. When installed, the air bag cover encloses the center portion of the steering wheel which can prevent the theft of the air bag device. The air bag cover further engages the steering column preventing the steering wheel from rotating and also is capable of enclosing the ignition switch on the steering column which prevents tampering. The bracket member removably and/or hindgedly and/or fixedly connected to the air bag cover will secure it to the steering wheel.

Accordingly, it is an object of the present invention to provide an anti-theft device.

More particularly, it is an object of the present invention to provide an air bag anti-theft device.

In keeping with these objects, and with others which will become apparent hereinafter, one feature of the present invention resides, briefly stated, is that it can prevent the theft of an air bag device.

When the air bag anti-theft device is designed in accordance with the present invention, it can provide a simple and affective measure against vehicle theft.

In accordance with another feature of the invention is that it can lock the steering wheel in place.

Another feature of the present invention is that it can enclose the ignition switch.

Yet another feature of the present invention is that it is of a simple design making the air bag ant-theft device easy to install.

Another feature of the present invention is that the it is a modestly costing device.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

BRIEF DESCRIPTION OF THE DRAWING

FIG. 1 is a perspective view of the air bag cover, bracket member and the lock which comprises the air bag anti-the device;

DETAILED DESCRIPTION OF THE PREFERRED EMBODIMENT

Firstly, referring to FIG. 1 which is a perspective view of the air bag cover 12, bracket member 14 and the lock 16 which comprises the air bag anti-theft device 10.

The air bag cover 12 consists of the front portion 12B, first side portion 12C, second side portion 12A and stabilizing member 12D. The first side portion 12C and second side portion 12A are substantially parallel to each other and each extend backward from one of the side edges of the front portion 12B. This configuration allows the air bag cover 12 to engage and enclose the center portion of the steering wheel 18A (shown in FIG. 2) containing the air bag device. The air bag cover 12 enclosing the center portion of the steering wheel 18A will deny access to this part of the vehicle, which will prevent the theft of the air bag device.

Figure 5:
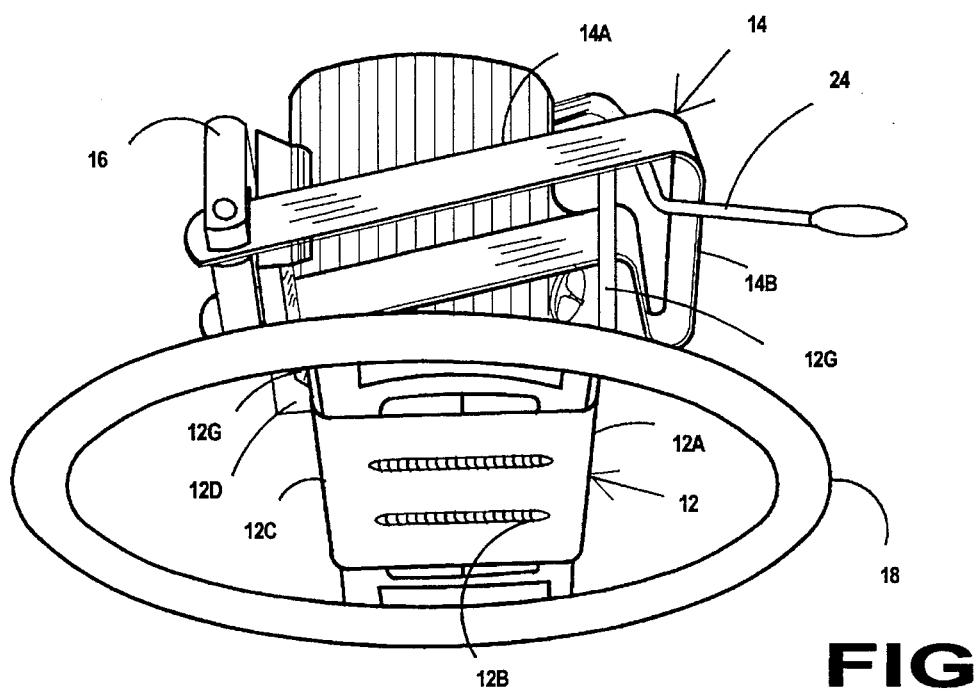
FIG. 5 is a top perspective view of the air bag anti-theft device secured to the steering wheel.

The second side portion 12A must be of a length that will allow the second side portion 12A to extend backward enclosing the ignition switch on the steering column 20 of the vehicle (shown in FIG. 5). The second side portion 12A enclosing the ignition switch will prevent tampering, which is a further feature of the air bag anti-theft device 10.

Contained within the rear-upper portion of both the first side portion 12C and second side portion 12A is a bracket slot 12F. The bracket slot 12F on the first side portion 12C extends into the stabilizing member 12D as shown. Both bracket slots 12F allow the bracket member 14 to be attached to the air bag cover 12. Extending outward from both the upper edges of both the first side portion 12C and second side portion 12A is a side flange 12G. Both side flanges 12G increase the surface area of the upper edge of both the first side portion 12C and second side portion 12A, which makes them stronger and harder to cut.

Attached to the rear edge of the first side portion 12C is the stabilizing member 12D. The stabilizing member 12D engages the left side of the steering column 20 (shown in FIG. 2) which functions to stabilize the air bag cover 12 on the steering wheel 18 (shown in FIG. 2). The stabilizing member 12D when engaged to the steering column 20 will further prevent the rotation of the steering column 18 which is another feature of the air bag anti-theft device 10.

The stabilizing member 12D consists of the front flange 12DA which extends outward approximately at a right angle from the rear edge of the first side portion 12C and the side flange 12DB which extends backward approximately at a right angle from the first edge of the front flange 12DA. The stabilizing member 12D further includes a top flange 12DC which is attached squarely to both the top edge of the front flange 12DA and side flange 12DB, and a bottom flange 12DD which is also squarely attached to the both the bottom edge of the front flange 12DA and side flange 12DB. The above discussed flanges are attached to each other at right angles so that the stabilizing member 12D will engage the three surfaces of the steering column 20 squarely.

Contained within the side flange 12DB is the first notch 12DE and second notch 12DF. The first notch 12DE is positioned within the upper portion of the rear edge of the side flange 12DB to allow an accessory lever such as a tilt wheel lever (not shown) to pass through. The second notch 12DF is positioned within the middle portion of the rear edge of the side flange 12DB to allow the signal lever 22 (shown in FIG. 2) to pass through.

The air bag cover has five embossments 12E stamped into its surface. Two embossments are contained within the front portion 12B (shown in FIG. 3), and one embossment is contained within each of the first side portion 12C, second side portion 12A and side flange 12DB. The embossments strengthen the air bag cover 12, which allows it to be fabricated from a thinner material. Also, the air bag cover 12 has protective trim 13 on its upper and lower edges. The protective trim 13 protects the steering wheel 18 of the vehicle from damage.

The bracket member 14 which is adapted to be attached to the air bag cover 12 functions to secure the air bag cover 12 to the steering wheel 18. The bracket member 14 consists of the first leg 14A, nose portion 14B and the second leg 14C. The first leg 14A and second leg 14C are substantially parallel to each other and are connected to each other by the nose portion 14B. The nose portion 14B is shown extending downward from the first leg 14A and second leg 14C.

The nose portion 14B provides added lateral strength to the bracket member 14. Because of the nose portion 14B configuration, it requires a greater force to pry the first leg 14A and second leg 14C apart, than if both legs were connected to each other by just a straight portion. Contained within the first distal end of both the first leg 14A and second leg 14C are the bracket orifices 14D. Both bracket orifices 14D are substantially aligned to each other to allow a locking means to pass through them.

Both the air bag cover 12 and bracket member 14 can be fabricated from various types of rigid metals or metal alloys. Although, preferably the air bag cover 12 and bracket member 14 should be fabricated from a low carbon cold rolled steel. The air bag cover 12 preferably should be fabricated from a low carbon cold rolled steel having a thickness of 3/32 of an inch, while the bracket member should be fabricated from the same material having a thickness of 3/16 of an inch. After the air bag cover 12 and bracket member 14 are fabricated from the low carbon rolled steel, they will be hardened by a case hardening process.

The lock 16 secures the bracket member 14 to the air bag cover and is an embodiment of the locking means. The lock 16 has two lock channels 16A and two lock cylinders 16B. The lock channels 16A are configured to receive the ends of the first leg 14A and second leg 14C of the bracket member 14. The lock cylinders 16B are capable of moving inward within the locking channels 16A passing through the bracket orifices 14D, thereby securing the ends of the first leg 14A and second leg 14C therein.

Figure 2:
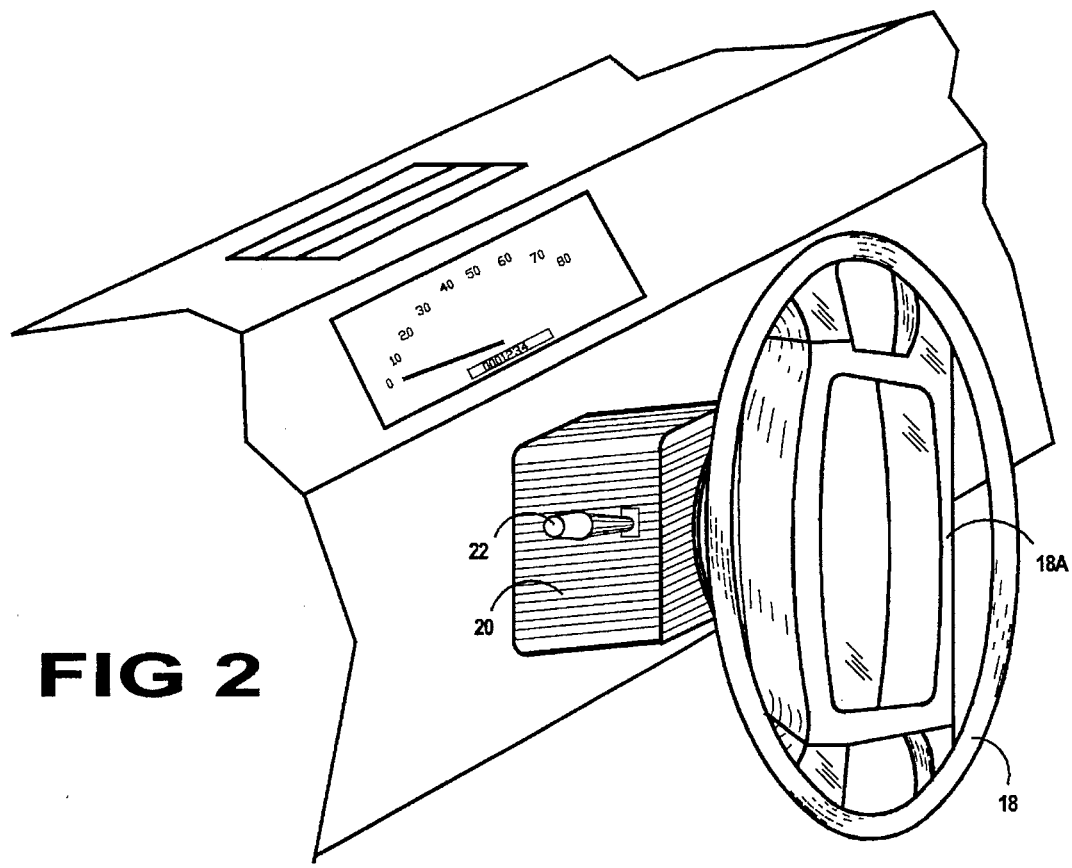
FIG. 2 is a left side perspective view of the steering wheel containing the air bag device.

Referring to FIG. 2 which is a left side perspective view of the steering wheel 18 containing the air bag device. The center portion of the steering wheel 18A contains the air bag device. The steering wall 18 is shown rotated approximately forty-five degrees from the straight position so that the center portion of the steering wheel 18A is vertical lengthwise. The air bag anti-theft device 10 can only be installed when the steering wheel 18 is in this position.

Figure 3:
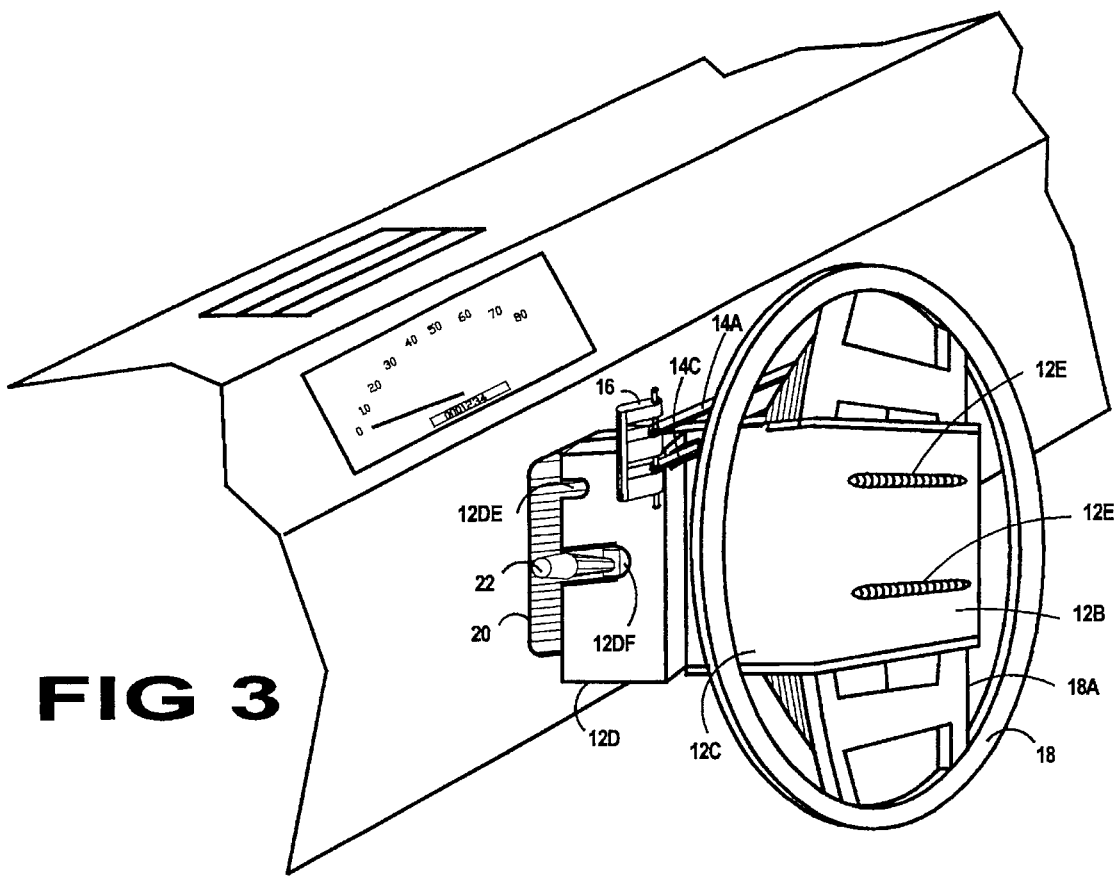
FIG. 3 is a left perspective view of the air bag anti-theft device secured to the steering wheel.

Referring to FIG. 3 which is a left perspective view of the air bag anti-theft device 10 secured to the steering wheel 18. The air bag cover 12 is engaging and enclosing the center portion of the steering wheel 18A. The stabilizing member 12D squarely engages the left side of the steering column 20. Because the stabilizing member 12D squarely engages the steering column 20, it cannot be forced to slip and allow the steering wheel 18 to rotate. The signal lever 22 is passing through the second notch 12DF.

Figure 4:
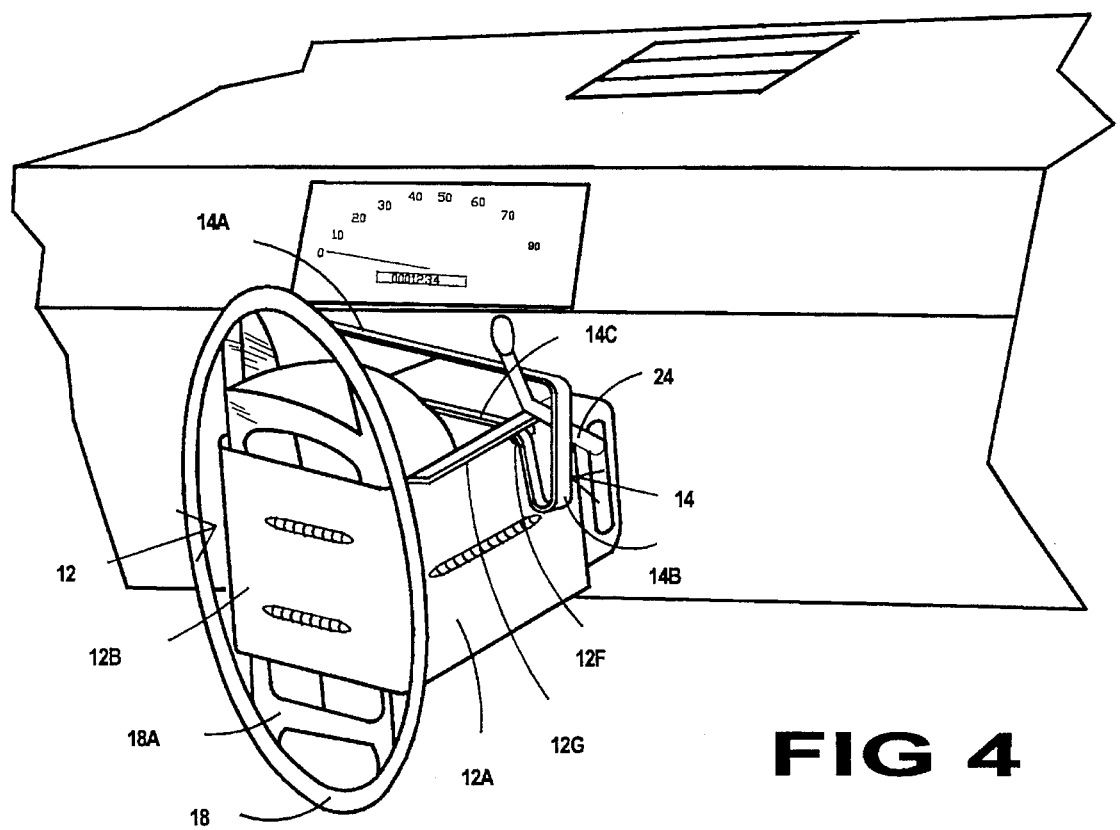
FIG. 4 is a right perspective view of the air bag anti-theft device secured to the steering wheel.

Referring to FIG. 4 which is a right perspective view of the air bag anti-theft device 10 secured to the steering wheel 18. The second side portion 12A extends backward enclosing the ignition switch on the steering column 20. The bracket member 14 is attached to the air bag cover 2, by placing the second leg 14C within the two bracket slots 12F as shown. Both ends of the first leg 14A and second leg 14B are in a position to be secured within the lock 16. The nose portion 14B is of a length to extend downward over the second side portion 12A, which acts as a barrier to prevent tools such as bolt cutters from trying to cut or damage the second side portion 12A. The nose portion 14B is further configured to allow the transmission lever 24 to pass through it.

Referring to FIG. 5 which is a top perspective view of the air bag anti-theft device 10 secured to the steering wheel 18. From this view both side flanges 12G are shown extending outward from the top edges of both the first side portion 12C and second side portion 12A. The first leg 14A and second leg 14B are secured within the lock 16, which will secure the bracket member 14 to the air bag cover 12.

When installing the air bag anti-theft device 10, the steering wheel 18 of the vehicle must be rotated approximately 45 degrees from the straight position as shown in FIG. 2. Then the air bag cover is placed over the center portion of the steering wheel 18A, thereby engaging the air bag cover 12 thereon. The second leg 14C is then slid into both bracket slots 12F attaching the bracket member 14 to the air bag cover 12 as shown in FIG. 4. Then the lock 16 is placed within both bracket orifices 14D, thereby securing the air bag cover 12 to the steering wheel 18.

It will be understood that each of the elements described above, or two or more together, may also find a useful application in other types of constructions differing from the type described above.

While the invention has been illustrated and described as embodied in an air bag anti-theft device, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An anti-theft device comprising:
   a) an air bag cover (12) adapted to engage a middle portion of a steering wheel (18) containing an air bag device, the air bag cover (12) comprises a front portion (12B) with a first side edge and a second side edge, a first side portion (12C) comprises a top edge wherein a first side flange (12G) extends outward from a top edge of the first side portion (12C) and a second side portion (12A) having a top edge and a second side flange (12G) extending outwardly from the top edge of the second side portion (12A), the second side portion (12A) enclosing an ignition switch located on the steering column (20) when the air bag cover (12) engages the middle portion of the steering wheel (18), the first side portion (12C) and the second side portion (12A) both extending backwardly from the front portion (12B) wherein the first side portion (12C) extends backwardly from the first side edge of the front portion (12B) and the second side portion (12A) extends backwardly from the second side edge of the front portion (12B) and the first side portion (12C) and second side portion (12B) are parallel;
   b) a stabilizing member (12D) is attached to the first side portion (12C) of the air bag cover, the stabilizing member (12D) engages the steering column (20) and the stabilizing member (12D) is attached to a rear edge of the first side portion (12C), the stabilizing member (12D) comprises a front flange (12DA) extending outwardly from the rear edge of the first side portion (12C), a side flange (12DB) that extends backwardly from the front flange (12DA), a top flange (12DC) is attached to a top edge of both the front flange (12DA) and the side flange (12DB), a bottom flange (12DD) attached to a bottom edge of both the front flange (12DA) and the side flange (12DB); and
   c) a bracket member (14) attached to the air bag cover (12) for securing the air bag cover (12) to the steering wheel (18).

2. The anti-theft device (10) as described in claim 1, wherein a first right angle is formed between the first side portion (12C) and the front flange (12DA), a second right angle is formed between the front flange (12DA) and the side flange (12DB).

3. The anti-theft device (10) as described in claim 2, wherein a rear edge of the side flange (12DB) has a first notch (12DE) and a second notch (12DF) contained therein.

4. The anti-theft device (10) as described in claim 3, wherein the air bag cover (12) has a plurality of embossments.

5. The anti-theft device (10) as described in claim 2, which further comprises a protective trim (13) attached to the an upper edge and a lower edge of the air bag cover (12).

* * * * *